(12) United States Patent
Ranjan et al.

(10) Patent No.: US 11,023,711 B2
(45) Date of Patent: Jun. 1, 2021

(54) ALL-IN-ONE CONVOLUTIONAL NEURAL NETWORK FOR FACE ANALYSIS

(71) Applicant: UNIVERSITY OF MARYLAND, COLLEGE PARK, College Park, MD (US)

(72) Inventors: Rajeev Ranjan, College Park, MD (US); Swaminathan Sankaranarayanan, University Park, MD (US); Carlos Castillo, Silver Spring, MD (US); Ramalingam Chellappa, Potomac, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 139 days.

(21) Appl. No.: 16/340,859

(22) PCT Filed: Oct. 10, 2017

(86) PCT No.: PCT/US2017/055948
§ 371 (c)(1),
(2) Date: Apr. 10, 2019

(87) PCT Pub. No.: WO2018/071424
PCT Pub. Date: Apr. 19, 2018

(65) Prior Publication Data
US 2019/0244014 A1    Aug. 8, 2019

Related U.S. Application Data

(60) Provisional application No. 62/406,260, filed on Oct. 10, 2016.

(51) Int. Cl.
*G06K 9/00* (2006.01)
*G06K 9/46* (2006.01)
*G06K 9/62* (2006.01)

(52) U.S. Cl.
CPC ..... *G06K 9/00288* (2013.01); *G06K 9/00228* (2013.01); *G06K 9/00302* (2013.01);
(Continued)

(58) Field of Classification Search
None
See application file for complete search history.

(56) References Cited

U.S. PATENT DOCUMENTS 6,038,337 A     3/2000 Lawrence et al.
10,289,897 B2*  5/2019 Tang .................... G06K 9/6215
(Continued)

OTHER PUBLICATIONS

International Search Report and Written Opinion dated Dec. 26, 2017 corresponding to International Patent Application No. PCT/US2017/055948.

*Primary Examiner* — Fayyaz Alam
(74) *Attorney, Agent, or Firm* — Squire Patton Boggs (US) LLP

(57) ABSTRACT

Various facial recognition systems may benefit from appropriate use of computer systems. For example, certain face analysis systems may benefit from an all-in-one convolutional neural network that has been appropriately configured. A method can include obtaining an image of a face. The method can also include processing the image of the face using a first set of convolutional network layers configured to perform subject-independent tasks. The method can further include subsequently processing the image of the face using a second set of convolutional network layers configured to perform subject-dependent tasks. The second set of convolutional network layers can be integrated with the first set of convolutional network layers to form a single convolutional neural network. The method can additionally include outputting facial image detection results based on the processing and subsequent processing.

30 Claims, 5 Drawing Sheets

(52) U.S. Cl.
CPC ......... *G06K 9/4628* (2013.01); *G06K 9/6262* (2013.01); *G06K 9/6267* (2013.01)

(56) References Cited

U.S. PATENT DOCUMENTS

| | | |
|---|---|---|
| 2015/0347820 A1 | 12/2015 | Yin et al. |
| 2016/0148079 A1 | 5/2016 | Shen et al. |
| 2016/0275341 A1* | 9/2016 | Li .................... G06K 9/4642 |
| 2018/0018553 A1* | 1/2018 | Bach .................. G06K 9/4628 |
| 2018/0096457 A1* | 4/2018 | Savvides ............... G06F 16/50 |

* cited by examiner

ALL-IN-ONE CONVOLUTIONAL NEURAL NETWORK FOR FACE ANALYSIS

CROSS-REFERENCE TO RELATED APPLICATION

This application is related to and claims the benefit and priority of U.S. Provisional Patent Application No. 62/406,260 filed on Oct. 10, 2017, the entirety of which is hereby incorporated herein by reference.

GOVERNMENT LICENSE RIGHTS

This invention was made with government support under 201414071600012 awarded by IARPA. The government has certain rights in the invention.

BACKGROUND

Field

Various facial recognition systems may benefit from appropriate use of computer systems. For example, certain face analysis systems may benefit from an all-in-one convolutional neural network that has been appropriately configured.

Description of the Related Art

Face analysis is a challenging and actively researched problem with applications to face recognition, emotion analysis, biometrics security, and the like. Though the performance of few challenging face analysis tasks such as unconstrained face detection and face verification have greatly improved when CNN-based methods are used, other tasks such as face alignment, head-pose estimation, gender and smile recognition are still challenging due to lack of large publicly available training data.

Furthermore, all these tasks have been approached as separate problems, which makes their integration into end-to-end systems inefficient. For example, a typical face recognition system needs to detect and align a face from the given image before processing for the identity. This results in error accumulation across different modules. Even though the tasks are correlated, they do not leverage the synergy among them.

SUMMARY

According to certain embodiments, a method can include obtaining an image of a face. The method can also include processing the image of the face using a first set of convolutional network layers configured to perform subject-independent tasks. The method can further include subsequently processing the image of the face using a second set of convolutional network layers configured to perform subject-dependent tasks. The second set of convolutional network layers can be integrated with the first set of convolutional network layers to form a single convolutional neural network. The method can additionally include outputting facial image detection results based on the processing and subsequent processing.

In certain embodiments, an apparatus can include at least one processor and at least one memory including computer program code. The at least one memory and the computer program code can be configured to, with the least one processor, cause the apparatus at least to obtain an image of a face. The at least one memory and the computer program code can also be configured to, with the least one processor, cause the apparatus at least to process the image of the face using a first set of convolutional network layers configured to perform subject-independent tasks. The at least one memory and the computer program code can further be configured to, with the least one processor, cause the apparatus at least to subsequently process the image of the face using a second set of convolutional network layers configured to perform subject-dependent tasks. The second set of convolutional network layers can be integrated with the first set of convolutional network layers to form a single convolutional neural network. The at least one memory and the computer program code can additionally be configured to, with the least one processor, cause the apparatus at least to output facial image detection results based on the processing and subsequent processing.

A non-transitory computer-readable medium can, in certain embodiments, be encoded with instructions that, when executed in hardware, perform a process. The process can include obtaining an image of a face. The process can also include processing the image of the face using a first set of convolutional network layers configured to perform subject-independent tasks. The process can further include subsequently processing the image of the face using a second set of convolutional network layers configured to perform subject-dependent tasks. The second set of convolutional network layers can be integrated with the first set of convolutional network layers to form a single convolutional neural network. The process can additionally include outputting facial image detection results based on the processing and subsequent processing.

An apparatus, according to certain embodiments, can include means for obtaining an image of a face. The apparatus can also include means for processing the image of the face using a first set of convolutional network layers configured to perform subject-independent tasks. The apparatus can further include means for subsequently processing the image of the face using a second set of convolutional network layers configured to perform subject-dependent tasks. The second set of convolutional network layers can be integrated with the first set of convolutional network layers to form a single convolutional neural network. The apparatus can additionally include means for outputting facial image detection results based on the processing and subsequent processing.

BRIEF DESCRIPTION OF THE DRAWINGS

For proper understanding of the invention, reference should be made to the accompanying drawings, wherein.

DETAILED DESCRIPTION

Figure 1:
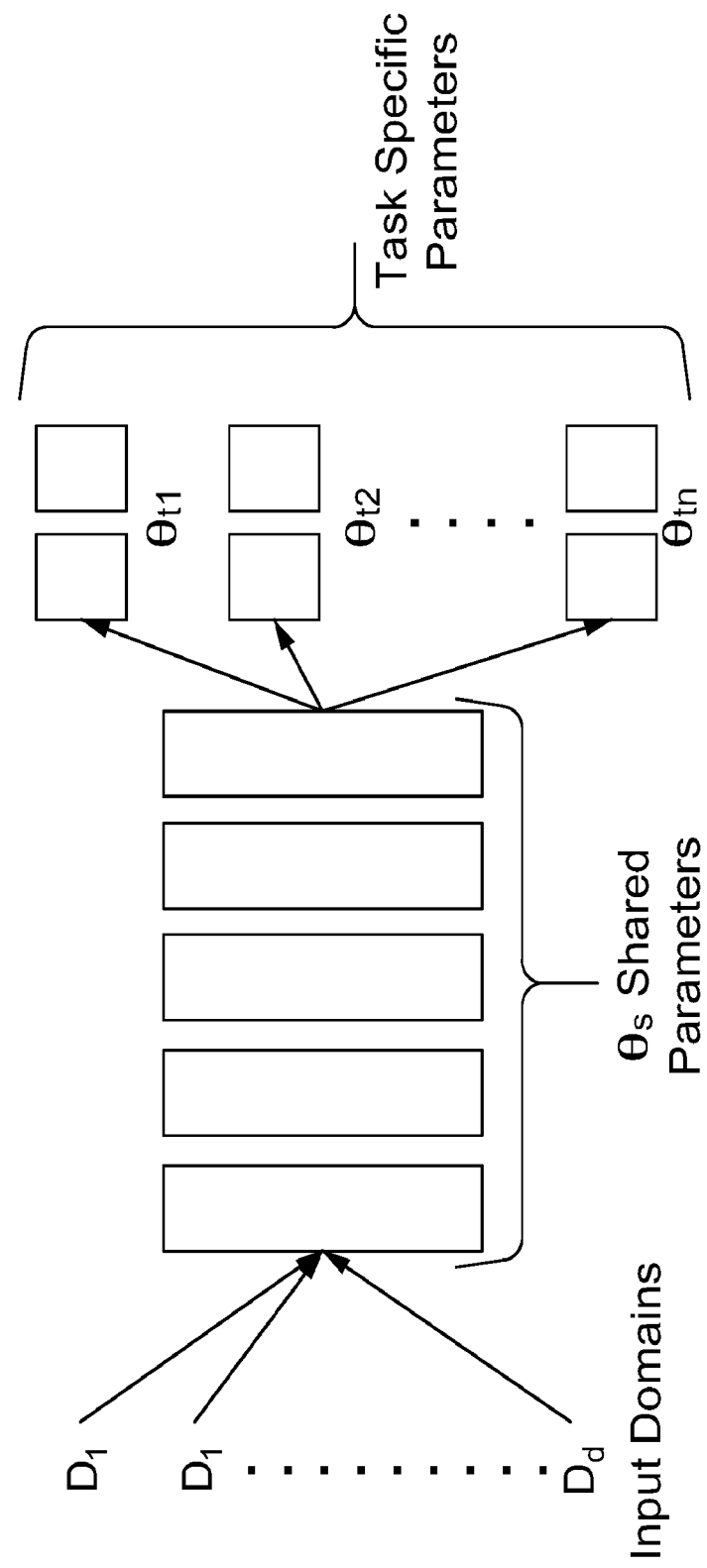
FIG. 1 illustrates a general multitask learning framework for a deep convolutional neural network architecture, according to certain embodiments of the present invention.

Certain embodiments of the present invention provide a multi-purpose convolutional neural network (CNN) that can simultaneously detect faces, extract key-points and pose angles, determine smile expression, age and gender from any unconstrained image of a face. Additionally, the CNN can assign an identity descriptor to each face. This identity descriptor can be used for face recognition and verification.

The CNN can be trained in a multi-task learning (MTL) framework that builds a synergy among different face related tasks. This synergy may improve the performance for each of the tasks.

Typically, a face analysis task uses a cropped face region as the input. The deep CNN can process the face to obtain a feature representation and extract meaningful information related to the task. Lower layers of CNN can learn features common to a general set of face analysis tasks, whereas upper layers can be more specific to individual task. Certain embodiments of the present invention share the parameters of lower layers of CNN among different tasks to produce a generic face representation which can be subsequently processed by the task-specific layers to generate desired outputs.

MTL can be viewed as a regularization methodology for deep CNNs. The MTL approach used in the framework of certain embodiments of the present invention can be explained by following two types of regularization: task-based regularization and domain-based regularization.

As to task-based regularization, the cost function for a given task $t_i$ with shared parameters $\theta_s$ and task-specific parameters $\theta_{t_i}$ can be designated $J_i(\theta_s, \theta_{t_i}; D)$, where D is the input data. For isolated learning, the optimum network parameters $(\theta^*_s, \theta^*_{t_i})$ can be computed using Equation (1)

$$(\theta^*_s, \theta^*_{t_i}) = \arg\min_{\theta_s, \theta_{t_i}} J_i(\theta_s, \theta_{t_i}; D) \quad (1)$$

For MTL, the optimal parameters for the task $t_i$ can be obtained by minimizing the weighted sum of loss functions for each task, as shown in Equation (2). The loss weight for task $t_i$ can be denoted by $\alpha_i$.

$$\theta^*_s, \theta^*_{t_i} = \arg\min_{\theta_s, \theta_t} \alpha_i J_i(\theta_s, \theta_t; D) + \sum_{j \neq i}^{n} \alpha_j J_j(\theta_s, \theta_t; D) \quad (2)$$

Since other tasks may contribute only to the learning of shared parameters, they can be interpreted as a regularizer $R_i$ on $\theta_s$ with respect to the given task $t_i$, as shown in Equation (3):

$$\theta^*_s, \theta^*_{t_i} = \arg\min_{\theta_s, \theta_t} J_i(\theta_s, \theta_t; D) + \lambda R_i(\theta_s; D) \quad (3)$$

Thus, MTL can shrink the solution space of $\theta_s$, such that the learned parameter vector is in consensus with all the tasks, thus reducing over-fitting and enabling the optimization procedure to find a more robust solution.

As to domain-based regularization, for face analysis tasks, there may not be a large dataset with annotations for face bounding box, fiducial points, pose, gender, age, smile and identity information available simultaneously. Hence, multiple CNNs can be trained with respective task-related datasets $D_i$, and the parameters can be shared among them. In this way, the shared parameter $\theta_s$ can adapt to the complete set of domains $(D_1, D_2, \ldots D_d)$ instead of fitting to a task-specific domain. Additionally, the total number of training samples can increase to the sum of available datasets, which may be advantageous for training deep CNNs. For example, there may be a dataset of about half a million samples for identification and gender, another dataset of about a quarter of a million samples for age and gender, and a third dataset of about a quarter of a million samples for smile and gender. These datasets, in combination with smaller datasets, may sum to about a million samples (see the example provided in U.S. Provisional Patent Application No. 62/406,260).

FIG. 1 illustrates a general multitask learning framework for a deep convolutional neural network architecture, according to certain embodiments of the present invention. The lower layers are shared among all the tasks and input domains. As shown in FIG. 1, multiple input domains $(D_1, D_2, \ldots D_d)$ can be processed by the lower layers and can provide shared parameters $\theta_s$. Then, individual task-specific layers can further process and provide task specific parameters $\theta_{t1}, \theta_{t2} \ldots \theta_{ti}$.

Figure 2:
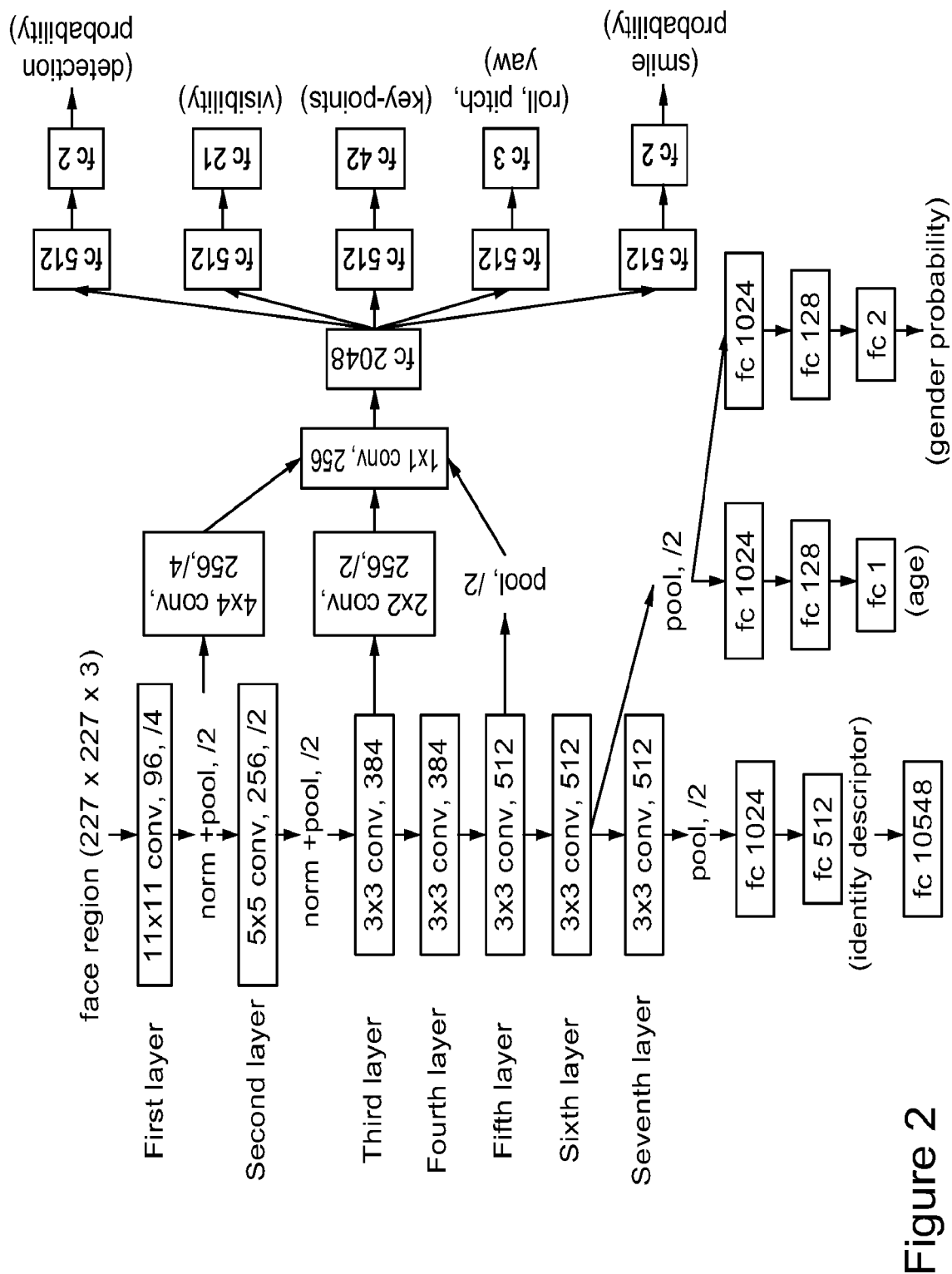
FIG. 2 illustrates a network architecture according to certain embodiments of the present invention.

FIG. 2 illustrates a network architecture according to certain embodiments of the present invention. The left column of components of the architecture may be a pre-trained face identification network. The network can include seven convolutional layers followed by three fully connected layers. This seven layer network can be a backbone network for training the face identification task and sharing the parameters from the first six convolution layers with the other face-related tasks. Each layer is, in this example, represented by filter kernel size, type of layer, number of feature maps and the filter stride.

Parametric Rectifier Linear units (PReLUs) can be used as the activation function. A CNN pre-trained on a face identification task may provide a better initialization for a generic face analysis task, since the filters can retain discriminative face information.

The tasks of the network can be divided into two groups: 1) subject-independent tasks which include face detection, keypoints localization and visibility, pose estimation and smile prediction, and 2) subject-dependent tasks which include age estimation, gender prediction and face recognition. The first, third, and fifth convolutional layers can be fused for training the subject-independent tasks. The first, third, and fifth layers may rely more on local information available from the lower layers of the network.

Two convolution layers and a pooling layer can be respectively added to these layers as shown in the second from the left column. These added layers can provide a consistent feature map size of 6×6. A dimensionality reduction layer, shown to the right of these added layers, can be added to reduce the number of feature maps to 256. The dimensionality reduction layer can be followed by a fully connected (fc) layer of dimension 2048 (shown to the right of the dimensionality reduction layer). The fully connected layer can form a generic representation for the subject-independent tasks. At this point, the specific tasks can be branched into fully connected layers of dimension 512 each, which are followed by the output layers respectively as shown on the right hand side.

The subject-dependent tasks of age estimation and gender classification can be branched out from the sixth convolutional layer of the backbone network after the max pooling operation, as shown in the lower right hand side of the figure. The global features thus obtained can be fed to a 3-layered fully connected network for each of these tasks.

The seventh convolutional layer can be kept unshared and can be adapted specifically to the face recognition task, and to provide an identity descriptor. Task-specific loss functions can be used to train the complete network end-to-end.

The training CNN model may, for example, contain five sub-networks with parameters shared among them as illustrated in FIG. 2. The tasks of face detection, key-points localization and visibility, and pose estimation can be trained in a single sub-network, since all of them may use a common dataset for training. The remaining tasks of smile detection, gender recognition, age estimation and face recognition can be trained using separate sub-networks. All tasks can be trained end-to-end simultaneously.

Face detection, key-points localization and pose estimation can be trained by first selecting 1000 images randomly from a dataset for testing, and using the remaining images for training. A selective search algorithm cabn be used to generate region proposals for faces from an image. Regions with Intersection-Over-Union (IOU) overlap of more than 0.5 with the ground truth bounding box can be considered positive examples whereas regions with IOU<0.35 can be chosen as negative examples for training the detection task using a softmax loss function. Facial landmarks, key-points visibility and pose estimation tasks can be treated as regression problems and trained with the Euclidean loss. Only those regions with IOU>0.35 may contribute to backpropagation during their training.

Gender recognition is, in this example, a binary classification problem similar to face detection. The training images can be first aligned using facial key-points which are either provided by the dataset or computed using another algorithm. A crossentropy loss LG can be used for training as shown in Equation (4)

$$L_G = -(1-g) \cdot \log(1-p_g) - g \cdot \log(p_g) \quad (4)$$

where g=0 for male and 1 for female. $p_g$ is the predicted probability that the input face is a female.

Smile detection and in particular the smile attribute can be trained to make the network robust to expression variations for face recognition. Similar to the gender classification task, the images can be aligned before passing them through the network. The loss function $L_S$ can be given by (5)

$$L_S = -(1-s) \cdot \log(1-p_s) - s \cdot \log(p_s) \quad (5)$$

where s=1 for a smiling face and 0 otherwise. $p_s$ is the predicted probability that the input face is a smiling.

The age estimation tasks can be formulated as a regression problem in which the network learns to predict the age from a face image. Gaussian loss may work better than Euclidean loss for apparent age estimation when the standard deviation of age is given. However, the gradient of Gaussian loss may be close to zero when the predicted age is far from the true age, which may slow the training process. Hence, a linear combination of these two loss functions weighted by λ can be used as shown in (6)

$$L_A = (1-\lambda)\frac{1}{2}(y-a)^2 + \lambda\left(1 - \exp\left(-\frac{(y-a)^2}{2\sigma^2}\right)\right) \quad (6)$$

where $L_A$ is the age loss, y is the predicted age, a is the ground-truth age and σ is the standard deviation of the annotated age value. λ can be initialized with 0 at the start of the training, and can be increased to 1 subsequently. For this example implementation, λ=0 was set initially and switched to 1 after 20 k iterations. a can be fixed to 3 if not provided by the training set.

For face recognition, the images can be aligned using another algorithm before passing them through the network. A multi-class crossentropy loss function $L_R$ can be used for training as shown in (7)

$$L_R = \Sigma_{c=0}^{10547} - y_c \cdot \log(p_c) \quad (7)$$

where $y_c$=1 if the sample belongs to class c, otherwise 0. The predicted probability that a sample belongs to class c can be given by $p_c$.

The final overall loss L can be the weighted sum of individual loss functions, given by (8):

$$L = \Sigma_{t=1}^{t=8} \lambda_t L_t \quad (8)$$

where $L_t$ is the loss and $\lambda_t$ is the loss-weight corresponding to task t. The loss-weights can be chosen empirically. A higher weight can be assigned to regression tasks as they may have lower loss magnitude than classification tasks.

Figure 3:
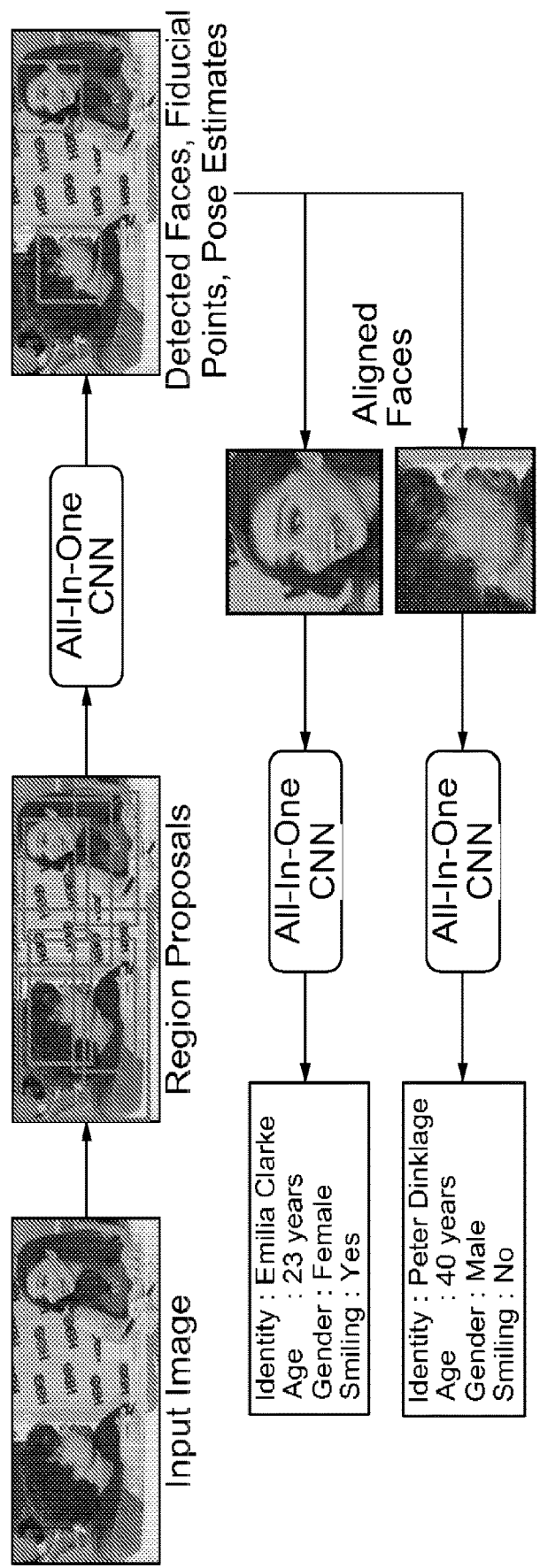
FIG. 3 illustrates testing according to certain embodiments of the present invention.

FIG. 3 illustrates testing according to certain embodiments of the present invention. As shown in FIG. 3, a two-stage process can be employed during test time. In the first stage, selective search can be used to generate region proposals from a test image, which can be passed through the network of certain embodiments of the present invention (see, for example, FIG. 2) to obtain the detection scores, pose estimates, fiducial points and their visibility. Iterative region proposals and landmarks-based NMS can be used to filter out non-faces and improve fiducials and pose estimates.

For the second stage, the obtained fiducial points can be used to align each detected face to a canonical view using similarity transform. The aligned faces, along with their flipped versions can again be passed through the network to get the smile, gender, age and identity information. The 512-dimensional feature from the penultimate fully connected layer of the identification network can be used as the identity descriptor.

Figure 4:
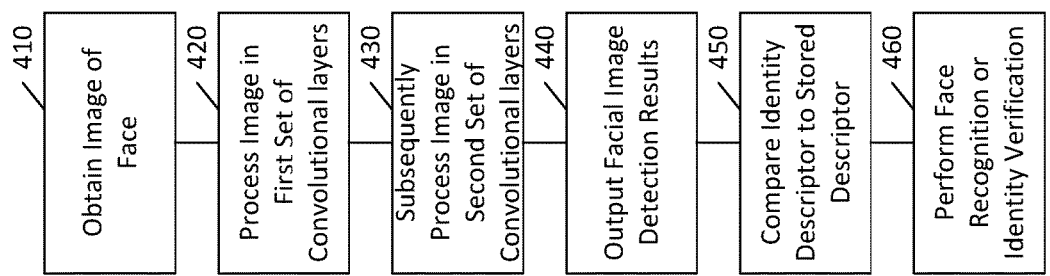
FIG. 4 illustrates a method according to certain embodiments of the present invention.

FIG. 4 illustrates a method according to certain embodiments of the present invention. As shown in FIG. 4, a method can include, at 410, obtaining an image of a face. This image may be obtained from an external system or algorithm and may be the result of selecting a candidate facial region from an unconstrained photograph or video frame.

The method can also include, at 420, processing the image of the face using a first set of convolutional network layers configured to perform subject-independent tasks. This processing may occur, for example, in the seven layer stack illustrated in the left hand column in FIG. 2. The first set of convolution layers can comprise a fusion of first, third, and fifth convolutional layers as shown in FIG. 2. Moreover, in the first set of convolution layers the fusion can be further attached to two convolutional layers and one or more pooling layers, to obtain a feature map of size 6×6. The first set of convolution layers can further include a dimensionality reduction layer to reduce a number of feature maps to 256. The dimensionality reduction layer can be followed by a fully connected layer of dimension 2048, configured to form a generic representation of the subject-independent tasks, as shown in FIG. 2 ("fc 2048").

The method can further include, at 430, subsequently processing the image of the face using a second set of convolutional network layers configured to perform subject-dependent tasks. The second set of convolutional network layers can be integrated with the first set of convolutional network layers to form a single convolutional neural network. This can be referred to as an "all-in-one convolutional neural network" as it is referred to in FIG. 3. The second set of convolutional network layers can include fully connected layers of dimension 512 each. The fully connected layers can be followed by output layers.

The method can additionally include, at 440, outputting facial image detection results based on the processing and subsequent processing. The results can include facial detection, key point extraction, pose angle, smile expression, age, and gender. All of these or a subset of these can be simultaneously output. The results can also include an identity descriptor corresponding to each detected face in the facial image detection results. The identity descriptor may be a 512 dimensional feature.

The method can further include, at 450, comparing the identity descriptor to a stored identity descriptor. The method can also include, at 460, performing a face recognition or identity verification based on the comparison.

Figure 5:
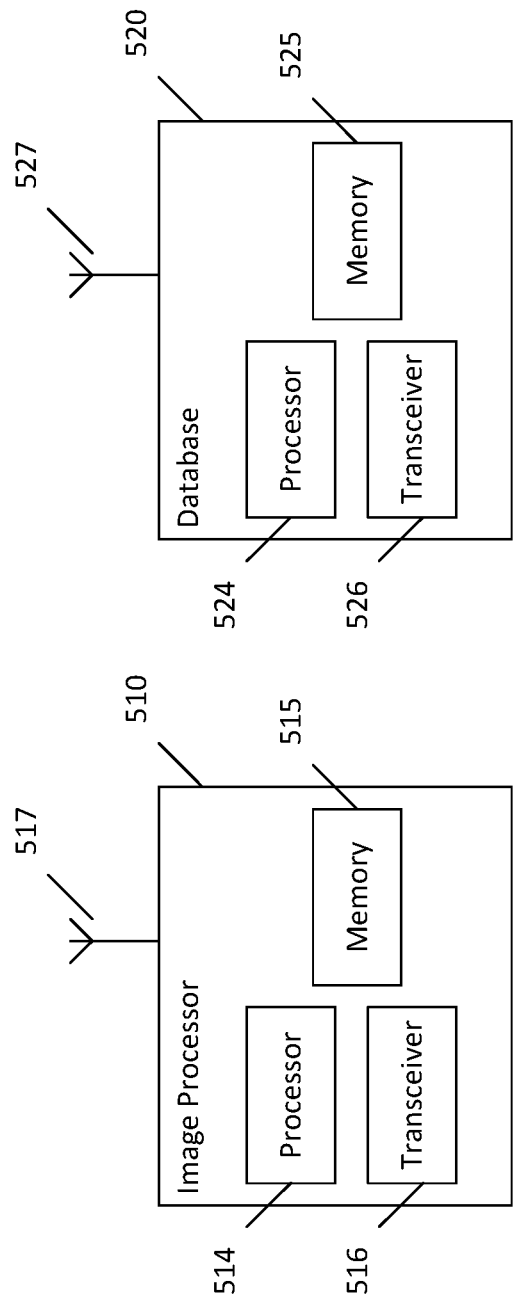
FIG. 5 illustrates a system according to certain embodiments of the present invention.

FIG. 5 illustrates a system according to certain embodiments of the invention. It should be understood that each block of the flowchart of FIG. 4 may be implemented by various means or their combinations, such as hardware, software, firmware, one or more processors and/or circuitry. In one embodiment, a system may include several devices, such as, for example, image processor 510 and database 520. The system may include more than one database 520 and more than one image processor 510, although only one of each is shown for the purposes of illustration. An image processor 510 may be any suitable computing system, such as for example a machine with 8 CPU cores and a GTX TITAN-X GPU. A database 520 may be any suitable storage system or storage array, and may be embodied in the same physical enclosure as the image processor 510.

Each of these devices may include at least one processor or control unit or module, respectively indicated as 514 and 524. At least one memory may be provided in each device, and indicated as 515 and 525, respectively. The memory may include computer program instructions or computer code contained therein, for example for carrying out the embodiments described above. One or more transceiver 516 and 526 may be provided, and each device may also include an antenna, respectively illustrated as 517 and 527. Although only one antenna each is shown, many antennas and multiple antenna elements may be provided to each of the devices. Other configurations of these devices, for example, may be provided. For example, image processor 510 and database 520 may be additionally or solely configured for wired communication, in addition to wireless communication, and in such a case antennas 517 and 527 may illustrate any form of communication hardware, without being limited to merely an antenna.

Transceivers 516 and 526 may each, independently, be a transmitter, a receiver, or both a transmitter and a receiver, or a unit or device that may be configured both for transmission and reception.

In an exemplifying embodiment, an apparatus, such as a node or computer system, may include means for carrying out embodiments described above in relation to FIG. 4.

Processors 514 and 524 may be embodied by any computational or data processing device, such as a central processing unit (CPU), digital signal processor (DSP), application specific integrated circuit (ASIC), programmable logic devices (PLDs), field programmable gate arrays (FPGAs), graphics processing unit (GPU), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof. The term circuitry may refer to one or more electric or electronic circuits. The term processor may refer to circuitry, such as logic circuitry, that responds to and processes instructions that drive a computer.

For firmware or software, the implementation may include modules or units of at least one chip set (e.g., procedures, functions, and so on). Memories 515 and 525 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as image processor 510 and/or database 520, to perform any of the processes described above (see, for example, FIG. 4). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 5 illustrates a system including an image processor 510 and a database 520, embodiments of the invention may be applicable to other configurations, and configurations involving additional elements, as illustrated and discussed herein.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. For example, although the above techniques have been described in terms of obtaining an image from single frames, the same techniques may be applied to short clips or bursts of images.

We claim:

1. A method, comprising:
   obtaining an image of a face;
   processing the image of the face using a first set of convolutional network layers configured to perform subject-independent tasks;
   subsequently processing the image of the face using a second set of convolutional network layers configured to perform subject-dependent tasks, wherein the second set of convolutional network layers is integrated with the first set of convolutional network layers to form a single convolutional neural network; and outputting facial image detection results based on the processing and subsequent processing.

2. The method of claim 1, wherein the results comprise a plurality of facial detection, key point extraction, pose angle, smile expression, age, and gender.

3. The method of claim 1, wherein the results comprise an identity descriptor corresponding to each detected face in the facial image detection results.

4. The method of claim 1, further comprising:
comparing the identity descriptor to a stored identity descriptor; and
performing a face recognition or identity verification based on the comparison.

5. The method of claim 1, wherein the first set of convolution layers comprise a fusion of first, third, and fifth convolutional layers.

6. The method of claim 5, wherein in the first set of convolution layers the fusion is further attached to two convolutional layers and pooling layers, to obtain a feature map of size 6×6.

7. The method of claim 6, wherein the first set of convolution layers further comprises a dimensionality reduction layer to reduce a number of feature maps to 256.

8. The method of claim 6, wherein the dimensionality reduction layer is followed by a fully connected layer of dimension 2048, configured to form a generic representation of the subject-independent tasks.

9. The method of claim 1, wherein the second set of convolutional network layers comprise fully connected layers of dimension 512 each.

10. The method of claim 9, wherein the fully connected layers are followed by output layers.

11. An apparatus, comprising:
at least one processor; and
at least one memory including computer program code,
wherein the at least one memory and the computer program code are configured to, with the least one processor, cause the apparatus at least to
obtain an image of a face;
process the image of the face using a first set of convolutional network layers configured to perform subject-independent tasks;
subsequently process the image of the face using a second set of convolutional network layers configured to perform subject-dependent tasks, wherein the second set of convolutional network layers is integrated with the first set of convolutional network layers to form a single convolutional neural network; and
output facial image detection results based on the processing and subsequent processing.

12. The apparatus of claim 11, wherein the results comprise a plurality of facial detection, key point extraction, pose angle, smile expression, age, and gender.

13. The apparatus of claim 11, wherein the results comprise an identity descriptor corresponding to each detected face in the facial image detection results.

14. The apparatus of claim 11, wherein the at least one memory and the computer program code are further configured to, with the least one processor, cause the apparatus at least to:
compare the identity descriptor to a stored identity descriptor; and
perform a face recognition or identity verification based on the comparison.

15. The apparatus of claim 11, wherein the first set of convolution layers comprise a fusion of first, third, and fifth convolutional layers.

16. The apparatus of claim 15, wherein in the first set of convolution layers the fusion is further attached to two convolutional layers and pooling layers, to obtain a feature map of size 6×6.

17. The apparatus of claim 16, wherein the first set of convolution layers further comprises a dimensionality reduction layer to reduce a number of feature maps to 256.

18. The apparatus of claim 16, wherein the dimensionality reduction layer is followed by a fully connected layer of dimension 2048, configured to form a generic representation of the subject-independent tasks.

19. The apparatus of claim 11, wherein the second set of convolutional network layers comprise fully connected layers of dimension 512 each.

20. The apparatus of claim 19, wherein the fully connected layers are followed by output layers.

21. A non-transitory computer-readable medium encoded with instructions that, when executed in hardware, perform a process, the process comprising:
obtaining an image of a face;
processing the image of the face using a first set of convolutional network layers configured to perform subject-independent tasks;
subsequently processing the image of the face using a second set of convolutional network layers configured to perform subject-dependent tasks, wherein the second set of convolutional network layers is integrated with the first set of convolutional network layers to form a single convolutional neural network; and
outputting facial image detection results based on the processing and subsequent processing.

22. The non-transitory computer-readable medium of claim 21, wherein the results comprise a plurality of facial detection, key point extraction, pose angle, smile expression, age, and gender.

23. The non-transitory computer-readable medium of claim 21, wherein the results comprise an identity descriptor corresponding to each detected face in the facial image detection results.

24. The non-transitory computer-readable medium of claim 21, the process further comprising:
comparing the identity descriptor to a stored identity descriptor; and
performing a face recognition or identity verification based on the comparison.

25. The non-transitory computer-readable medium of claim 21, wherein the first set of convolution layers comprise a fusion of first, third, and fifth convolutional layers.

26. The non-transitory computer-readable medium of claim 25, wherein in the first set of convolution layers the fusion is further attached to two convolutional layers and pooling layers, to obtain a feature map of size 6×6.

27. The non-transitory computer-readable medium of claim 26, wherein the first set of convolution layers further comprises a dimensionality reduction layer to reduce a number of feature maps to 256.

28. The non-transitory computer-readable medium of claim 26, wherein the dimensionality reduction layer is followed by a fully connected layer of dimension 2048, configured to form a generic representation of the subject-independent tasks.

29. The non-transitory computer-readable medium of claim 21, wherein the second set of convolutional network layers comprise fully connected layers of dimension 512 each.

30. The non-transitory computer-readable medium of claim 29, wherein the fully connected layers are followed by output layers.

\* \* \* \* \*